(12) United States Patent
Butcher

(10) Patent No.: US 7,216,248 B2
(45) Date of Patent: May 8, 2007

(54) ON-CHIP CLOCK GENERATOR ALLOWING RAPID CHANGES OF ON-CHIP CLOCK FREQUENCY

(75) Inventor: Lawrence Butcher, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 765 days.

(21) Appl. No.: 10/393,229

(22) Filed: Mar. 20, 2003

(65) Prior Publication Data

US 2004/0187045 A1 Sep. 23, 2004

(51) Int. Cl.
*G06F 1/00* (2006.01)
(52) U.S. Cl. ..................................... 713/500
(58) Field of Classification Search ................. 713/500
See application file for complete search history.

(56) References Cited

U.S. PATENT DOCUMENTS

| | | | | |
|---|---|---|---|---|
| 3,806,826 A * | 4/1974 | Schlosser | .................... | 331/1 A |
| 5,615,357 A | 3/1997 | Ball | ........................... | 395/500 |
| 5,636,130 A | 6/1997 | Salem et al. | ................. | 364/488 |
| 5,850,355 A | 12/1998 | Molnar | ........................ | 364/578 |
| 5,905,883 A | 5/1999 | Kasuya | ........................ | 395/500 |
| 6,077,304 A | 6/2000 | Kasuya | ........................ | 703/14 |
| 6,078,633 A * | 6/2000 | Shiotsu et al. | ............... | 375/374 |
| 6,311,287 B1 * | 10/2001 | Dischler et al. | ............. | 713/601 |
| 6,329,860 B1 * | 12/2001 | Komatsu | ..................... | 327/291 |
| 6,510,400 B1 | 1/2003 | Moriyama | .................. | 702/132 |
| 2001/0043652 A1 * | 11/2001 | Hooley | ........................ | 375/238 |

FOREIGN PATENT DOCUMENTS

EP 0 242 010 A1 12/1987

* cited by examiner

*Primary Examiner*—Rehana Perveen
*Assistant Examiner*—Eric Chang
(74) *Attorney, Agent, or Firm*—Martine Penilla & Gencarella, LLP

(57) ABSTRACT

A method and apparatus are provided, the method and apparatus comprising sending an output of a free-running counter to a comparator for a clock shaper logic unit, the free-running counter incremented every time a double-speed clock rises for an on-chip system and sending at least one input from a central processing unit (CPU) to the comparator for the clock shaper logic unit, the at least one input specifying a desired frequency. The method and apparatus also comprises producing a central processing unit (CPU) clock in the clock shaper logic unit based on the output of the free-running counter and the at least one input specifying the desired frequency by comparing a bit-reversed version of the output of the free-running counter with the at least one input specifying the desired frequency.

36 Claims, 13 Drawing Sheets

ON-CHIP CLOCK GENERATOR ALLOWING RAPID CHANGES OF ON-CHIP CLOCK FREQUENCY

BACKGROUND OF THE INVENTION

1. Field of the Invention

This invention relates generally to computer software and, more particularly, to a method and an apparatus for enabling an on-chip clock system to change frequencies as rapidly as needed.

2. Description of the Related Art

Computers typically have a timebase upon which the computers base their internal timing. Computers frequently find that the computers are idle. During such idle times, the computers often desire to decrease their power consumption.

Some conventional computers reduce their power consumption by slowing down their external timebases. Many clock chips support the changing of their output period under computer control in a safe way. One example of a conventional clock chip that supports the changing of its output period under computer control in a safe way is the Cypress CY2291.

However, such off-chip clock generators can typically vary their output frequency only slowly to reduce system power. Because of the requirements imposed on this sort of clock chip by the phase locked loops (PLLs), which can only use slowly varying clocks, in central processing units (CPUs), external clock chips cannot hop from one operating frequency to another operating frequency quickly. Such external or off-chip clock generators cannot be used when a central processing unit (CPU) needs to jump from sleep or idle mode to full speed quickly.

The present invention is directed to overcoming, or at least reducing the effects of, one or more of the problems set forth above.

SUMMARY OF THE INVENTION

In one aspect of the present invention, a method is provided, the method comprising sending an output of a free-running counter to a comparator for a clock shaper logic unit, the free-running counter incremented every time a double-speed clock rises for an on-chip system and sending at least one input from a central processing unit (CPU) to the comparator for the clock shaper logic unit, the at least one input specifying a desired frequency. The method also comprises producing a central processing unit (CPU) clock in the clock shaper logic unit based on the output of the free-running counter and the at least one input specifying the desired frequency by comparing a bit-reversed version of the output of the free-running counter with the at least one input specifying the desired frequency.

In another aspect of the present invention, a computer-readable, program storage device is provided, encoded with instructions that, when executed by a computer, perform a method, the method comprising sending an output of a free-running counter to a comparator for a clock shaper logic unit, the free-running counter incremented every time a double-speed clock rises for an on-chip system and sending at least one input from a central processing unit (CPU) to the comparator for the clock shaper logic unit, the at least one input specifying a desired frequency. The method also comprises producing a central processing unit (CPU) clock in the clock shaper logic unit based on the output of the free-running counter and the at least one input specifying the desired frequency by comparing a bit-reversed version of the output of the free-running counter with the at least one input specifying the desired frequency.

In yet another aspect of the present invention, a computer programmed to perform a method is provided, the method comprising sending an output of a free-running counter to a comparator for a clock shaper logic unit, the free-running counter incremented every time a double-speed clock rises for an on-chip system and sending at least one input from a central processing unit (CPU) to the comparator for the clock shaper logic unit, the at least one input specifying a desired frequency. The method also comprises producing a central processing unit (CPU) clock in the clock shaper logic unit based on the output of the free-running counter and the at least one input specifying the desired frequency by comparing a bit-reversed version of the output of the free-running counter with the at least one input specifying the desired frequency.

In another aspect of the present invention, an apparatus is provided. The apparatus may be an on-chip system. The apparatus comprises a clock shaper logic unit having a comparator and a free-running counter capable of sending an output to the comparator for the clock shaper logic unit, the free-running counter incremented every time a double-speed clock rises for the on-chip system. The apparatus also comprises a central processing unit (CPU) capable of sending at least one input to the clock shaper logic unit, the at least one input specifying a desired frequency, wherein the clock shaper logic unit is capable of producing a central processing unit (CPU) clock based on the output of the free-running counter and the at least one input specifying the desired frequency by comparing a bit-reversed version of the output of the free-running counter with the at least one input specifying the desired frequency.

A more complete understanding of the present invention, as well as a realization of additional advantages and objects thereof, will be afforded to those skilled in the art by a consideration of the following detailed description of the embodiment. Reference will be made to the appended sheets of drawings, which will first be described briefly.

BRIEF DESCRIPTION OF THE DRAWINGS

The invention may be understood by reference to the following description taken in conjunction with the accompanying drawings, in which the leftmost significant digit(s) in the reference numerals denote(s) the first figure in which the respective reference numerals appear, and in which.

Figure 1:
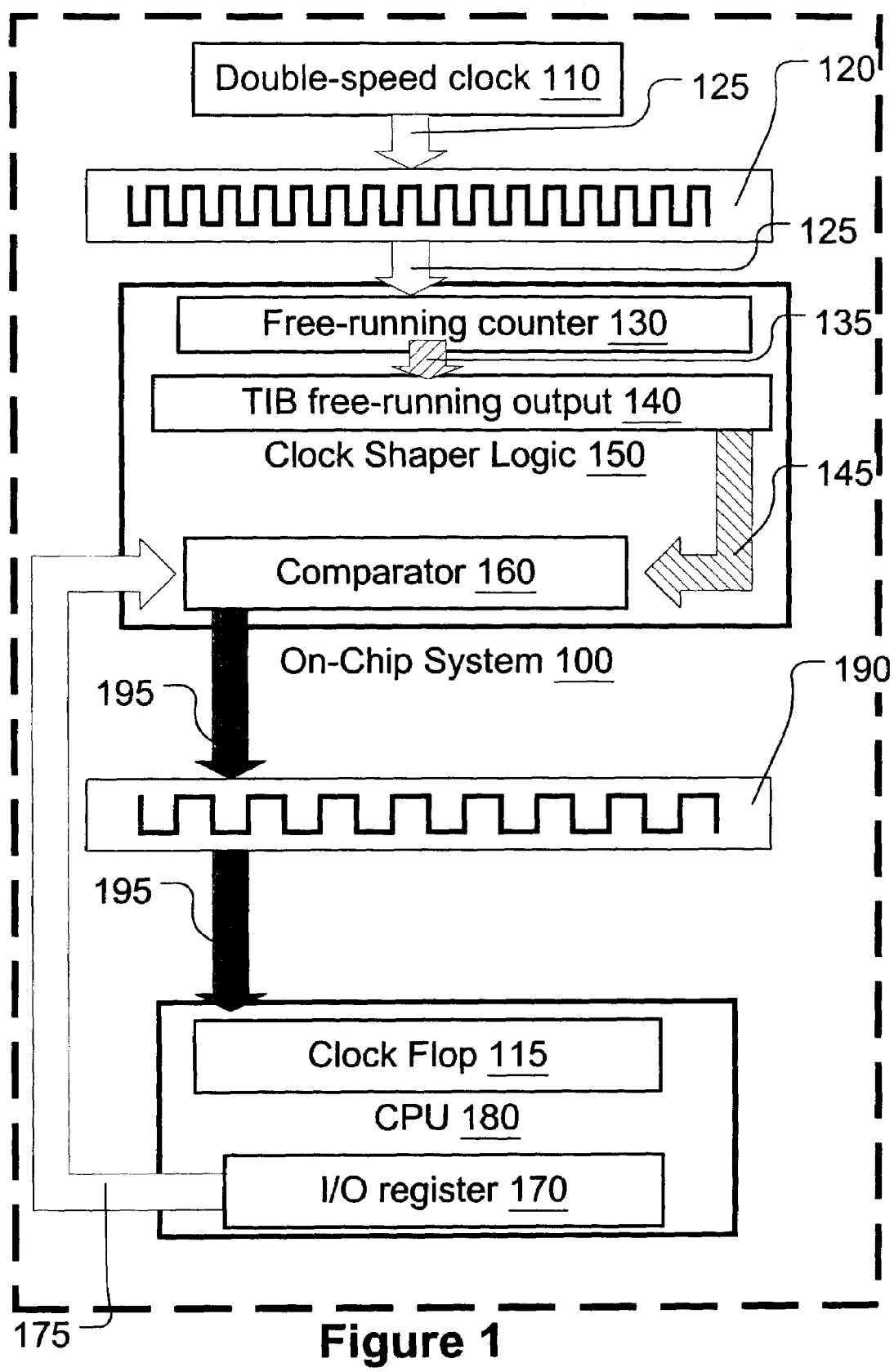
FIGS. 1–13 schematically illustrate various embodiments of a method, a system and a device according to the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Illustrative embodiments of a method and a device according to the present invention are shown in FIGS. 1–13. In various illustrative embodiments of the present invention, the system starts with an internal phase locked loop (PLL) and/or an external clock source that makes a clock with a frequency that is twice the maximum operating frequency needed by the central processing unit (CPU). This double-speed clock provides clocking for a single flip-flop, called the "Clock Flop." The output of the Clock Flop 115 is the root of the central processing unit (CPU) Clock Tree and serves as the timebase for all calculations.

The input of the Clock Flop determines the speed of the central processing unit (CPU) clock. If the input changes every time the double-speed clock changes, the Clock Flop outputs a signal to the Clock Tree that is a square wave at the maximum operating frequency of the central processing unit (CPU).

If the input does not change at all, the central processing unit (CPU) clock is constant. This case corresponds to the minimum power consumption state for the system.

The logic unit that determines the input to the Clock Flop operates on the same double-speed clock the Clock Flop runs on. The logic unit is called the "Clock Shaper Logic."

In various illustrative embodiments, the central processing unit (CPU) has an input/output (I/O) register that the central processing unit (CPU) uses to choose a desired central processing unit (CPU) clock frequency. The output of the input/output (I/O) register is sent to the Clock Shaper Logic. The output of the input/output (I/O) register is synchronized to the double-speed clock domain, as are all inputs to the Clock Shaper Logic. The output of the input/output (I/O) register, synchronized to the double-speed clock domain, is used to change the clock output.

The Clock Shaper Logic uses the information from the central processing unit (CPU) to create a sequence of "1's" and "0's" to send to the Clock Flop. These data items result in the desired central processing unit (CPU) clock frequency.

As a concrete example, the double-speed clock may run at 200 MHz. In this case, the maximum frequency available at the output of the Clock Flop will be that of a 100 MHz square wave. The central processing unit (CPU) might indicate that the central processing unit (CPU) only needs about 50 million Clock Edges to be able to execute all the tasks that the central processing unit (CPU) has pending.

One way for the Clock Shaper Logic to do this would be for the Clock Shaper Logic to output 10 central processing unit (CPU) Clocks at 100 MHz, then wait 10 clock times while holding the central processing unit (CPU) Clock constant. The central processing unit (CPU) would run, then stop, then run, then stop, and so forth. However, this may not be desirable, since the power supply would have to supply power when the load had a large low-frequency component.

The Clock Shaper Logic may instead try to create a central processing unit (CPU) Clock with a more constant power consumption. The Clock Shaper Logic may achieve this by sending a different sequence of "1's" and "0's" to the Clock Flop. In this case, the Clock Shaper Logic may send 1,1,0,0,1,1,0,0, and so forth. The resulting central processing unit (CPU) Clock from the Clock Flop 115 is a square wave running at 50 MHz.

The Clock Shaper Logic might want to calculate the most symmetrical waveform possible for all the frequencies the Clock Shaper Logic is asked to produce, resulting in the most constant power consumption possible. For example, this might be achieved by looking up in a table the pattern to send to the Clock Flop for each operating frequency desired for the central processing unit (CPU) Clock.

Another way would be to use a Bresenham-type algorithm to decide when to change the input to the Clock Flop. The Clock Shaper Logic could comprise a "Present Value Register," a "Next Plus Offset" to add to the Present Value Register to calculate a new Present Value, and a "Next Minus Offset" to subtract from the Present Value Register whenever the Present Value Register overflows due to the first addition. This may result in a central processing unit (CPU) Clock with very good low-frequency characteristics. However, the Present Value Register would have to be resettable whenever the Desired Frequency information from the central processing unit (CPU) changes. The Next Plus Offset and the Next Minus Offset would have to change at the same time.

In various illustrative embodiments, a simpler, more robust scheme may be used. As shown in FIG. 1, in various illustrative embodiments of the present invention, an on-chip system 100 is provided, the on-chip system 100 comprising a double-speed clock 110 sending a square-wave output 120, as shown by arrows 125, to a Clock Shaper Logic unit 150 that sends a clock output 190 as shown by arrows 195, to a central processing unit (CPU) 180. The Clock Shaper Logic unit 150 may comprise a free-running counter 130, receiving the square-wave output 120 of the double-speed clock 110 and putting out a free-running counter output 135 and a bit-reversed (TIB) free-running output 140, and a comparator 160.

The Clock Shaper Logic unit 150 takes the free-running counter output 135 from the free-running counter 130 and bit-reverses the free-running counter output 135 to produce the bit-reversed (TIB) free-running counter output 140. The comparator 160 receives the bit-reversed (TIB) free-running counter output 140, as shown by the arrow 145, and also receives Desired Frequency information 175 (also known as central processing unit (CPU) Clock Speed Selection data 175) from an input/output (I/O) register 170 in the central processing unit (CPU) 180. The comparator 160 compares the bit-reversed (TIB) free-running counter output 140 with the Desired Frequency information 175 from the input/output (I/O) register 170 in the central processing unit (CPU) 180 to produce the clock output 190 sent, as shown by the arrows 195, to a Clock Flop 115 in the central processing unit (CPU) 180.

The Clock Shaper Logic 150 may maintain the free-running counter 130. The free-running counter 130 increments every time the double-speed clock 110 rises. This free-running counter 130 may be compared to the Desired Frequency information 175 provided by the central processing unit (CPU) 180. The result of the comparison may be used as the input 190 to the Clock Flop 115.

To give another concrete example, the Desired Frequency information 175 from the central processing unit (CPU) 180 may be encoded as a 4-bit number. Expressed in binary, the value "0000" may mean to run the Clock Flop 115 as slow as possible and the value "1111" may mean to run the Clock Flop 115 as fast as possible. Intermediate values, greater than 0000 and less than 1111, may mean to run the Clock Flop 115 at a corresponding intermediate rate. With a 4-bit number, 16 discrete Clock Flop 115 rates may be specified. Similarly, with an n-bit number, $2^n$ discrete Clock Flop 115 rates may be specified.

The Clock Shaper Logic 150 may compare (for example, in the comparator 160) the free-running counter output 135 (and/or the bit-reversed (TIB) free-running counter output 140) with the central processing unit (CPU) Clock Speed Selection data 175 from the central processing unit (CPU) 180 using this formula:

If the free-running counter output 135 is less than or equal to the central processing unit (CPU) Clock Speed Selection data 175, invert the input 190 to the Clock Flop 115; otherwise, leave the input 190 to the Clock Flop 115 unchanged.

For example, if the central processing unit (CPU) 180 requests the speed 1111 (fastest speed), the comparison of the free-running counter output 135 with the central processing unit (CPU) Clock Speed Selection data 175 from the central processing unit (CPU) 180, according to the above formula, will invert the input 190 to the Clock Flop 115 every time the double-speed clock 110 rises. This is due to the fact that $b_4b_3b_2b_1 \leq 1111$ for all bit values $b_i$ (=0 or 1) for i=1, 2, 3, 4.

Similarly, if the central processing unit (CPU) 180 requests the speed 0000 (slowest speed), the comparison of the free-running counter output 135 with the central processing unit (CPU) Clock Speed Selection data 175 from the central processing unit (CPU) 180, according to the above formula, will invert the input 190 to the Clock Flop 115 only once every 16 times the double-speed clock 110 rises. This is due to the fact that $b_4b_3b_2b_1 \leq 0000$ only for the bit values $b_i$=0 for i=1, 2, 3, 4.

Likewise, if the central processing unit (CPU) 180 requests the speed 0111 (half speed), the comparison of the free-running counter output 135 with the central processing unit (CPU) Clock Speed Selection data 175 from the central processing unit (CPU) 180, according to the above formula, will invert the input 190 to the Clock Flop 115 the first 8 times the double-speed counter rises, and then leave the input to the Clock Flop constant and unchanged the next 8 times the double-speed clock 110 rises. This is due to the fact that $b_4b_3b_2b_1 \leq 0111$ only for the bit values $b_4$=0 and $b_i$ (=0 or 1) for i=1, 2, 3.

However, this results in the clock toggling for 8 central processing unit (CPU) Clock periods and then resting for 8 central processing unit (CPU) Clock periods. This is similar to the less desirable power supply situation described above.

In various illustrative embodiments, the comparison is not done against the free-running counter output 135, but rather against the bit-reversed (TIB) output 140 of the free-running counter 130. The output 135 of the free-running counter 130 may be reversed bit for bit, and the bit-reversed (TIB) output 140 of the free-running counter 130 may be compared to the Desired Frequency information 175 sent from the central processing unit (CPU) 180.

Figure 2:
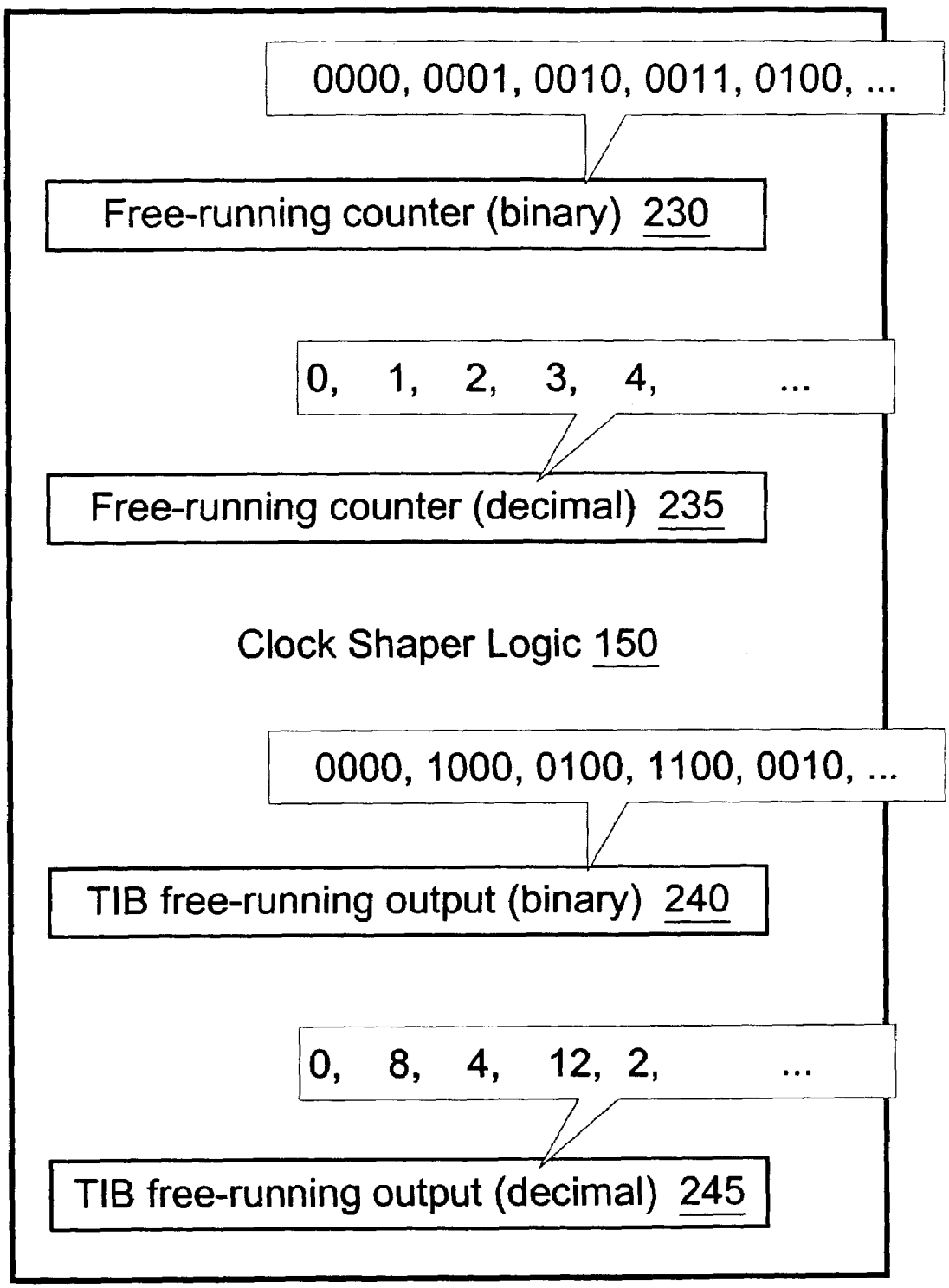

As shown in FIG. 2, the original output 135 of the free-running counter 130 (expressed in decimal 235, base-10, and binary 230, base-2) is:

0, 1, 2, 3, 4, 5, 6, 7,
0000, 0001, 0010, 0011, 0100, 0101, 0110, 0111,
8, 9, 10, 11, 12, 13, 14, 15
1000, 1001, 1010, 1011, 1100, 1101, 1110, 1111.

The bit-reversed (TIB) output 140 of the free-running counter 130 (expressed in decimal 245, base-10, and binary 240, base-2) is:

0, 8, 4, 12, 2, 10, 6, 14,
0000, 1000, 0100, 1100, 0010, 1010, 0110, 1110,
1, 9, 5, 13, 3, 11, 7, 15
0001, 1001, 0101, 1101, 0011, 1011, 0111, 1111.

As shown in FIG. 1, when the central processing unit (CPU) 180 requests the speed 1111 (fastest speed), the comparison (for example, in the comparator 160) of this bit-reversed (TIB) output 140 of the free-running counter 130 with the central processing unit (CPU) Clock Speed Selection data 175 from the central processing unit (CPU) 180, may be made according to the following bit-reversed (TIB) formula:

If the bit-reversed (TIB) output 140 of the free-running counter 130 is less than or equal to the central processing unit (CPU) Clock Speed Selection data 175, invert the input 190 to the Clock Flop 115; otherwise, leave the input 190 to the Clock Flop 115 unchanged.

This will again invert the input 190 to the Clock Flop 115 every time the double-speed clock 110 rises, as shown in FIG. 1. This is again due to the fact that $b_4b_3b_2b_1 \leq 1111$ for all bit values $b_i$ (=0 or 1) for i=1, 2, 3, 4. The input 190 to the Clock Flop 115 will thus be: 0,1,0,1,0,1,0,1,0,1,0,1,0,1, 0,1, and so forth. This will result in the desired 100% duty cycle.

Figure 3:
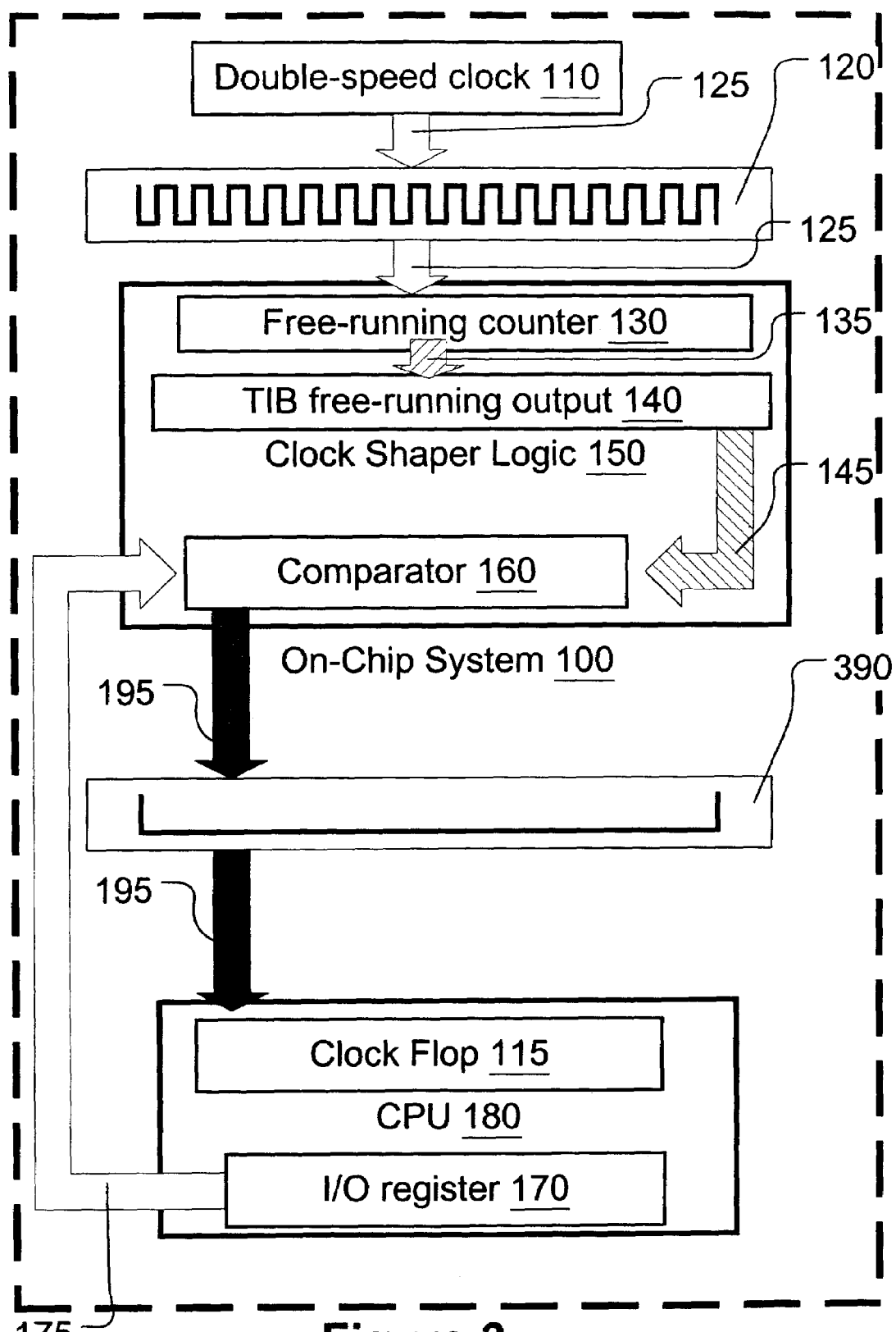

Similarly, as shown in FIG. 3, when the central processing unit (CPU) 180 requests the speed 0000 (slowest speed), the comparison (for example, in the comparator 160) of the bit-reversed (TIB) output 140 of the free-running counter 130 with the central processing unit (CPU) Clock Speed Selection data 175 from the central processing unit (CPU) 180, according to the above bit-reversed (TIB) formula, will again invert the input 390 to the Clock Flop 115 only once every 16 times the double-speed clock 110 rises, as shown in FIG. 3. This is again due to the fact that $b_4b_3b_2b_1 \leq 0000$ only for the bit values $b_i$=0 for i=1, 2, 3, 4. The input to the Clock Flop 115 will thus be: 0,0,0,0,0,0,0,0,0,0,0,0,0,0,0, 1,1,1,1,1,1,1,1,1,1,1,1,1,1,1,0,0,0,0,0,0,0,0,0,0,0,0,0,0,0, and so forth. This will result in the desired 6.25% duty cycle.

Figure 4:
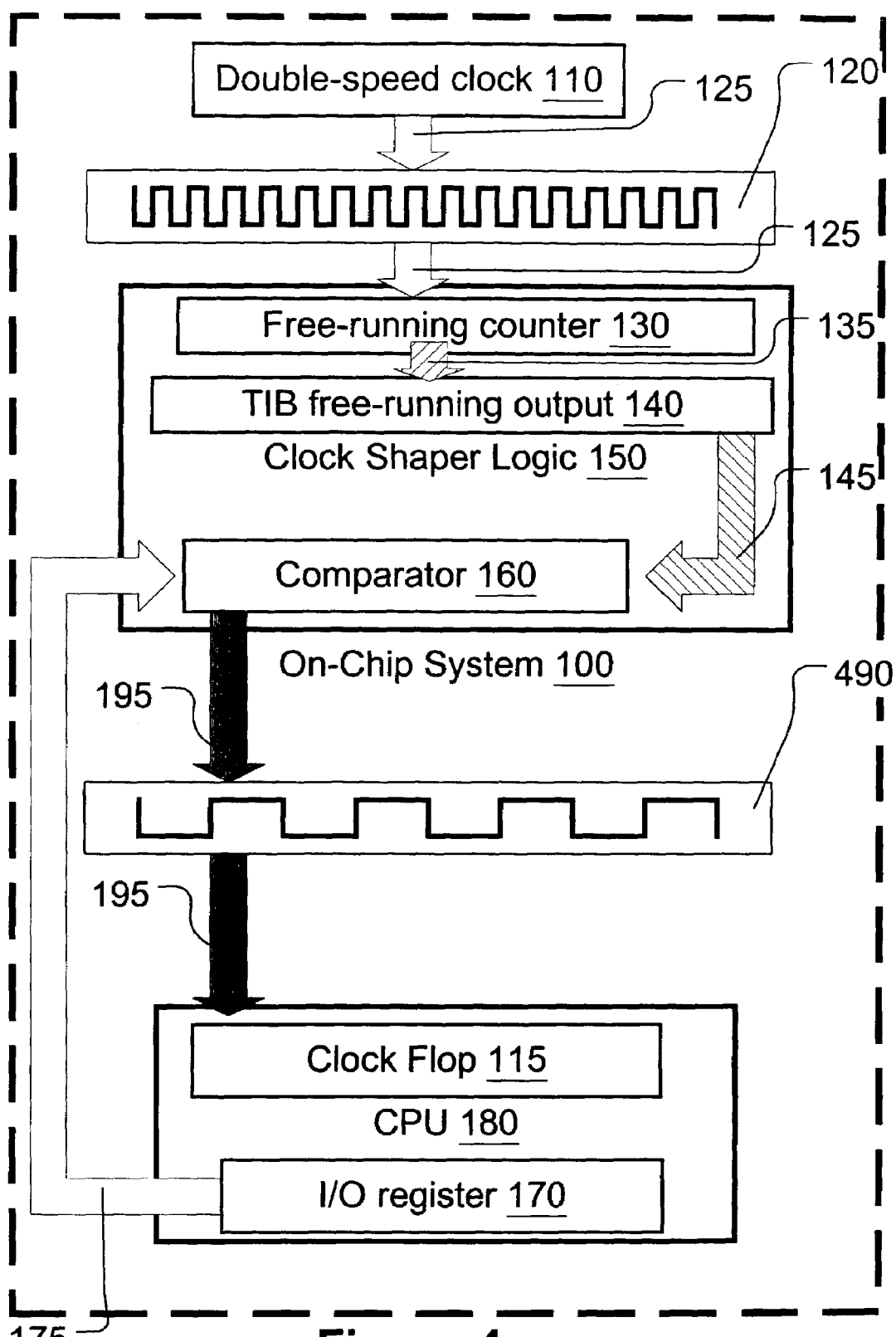

However, as shown in FIG. 4, when the central processing unit (CPU) 180 requests the speed 0111 (half speed), the comparison (for example, in the comparator 160) of the bit-reversed (TIB) output 140 of the free-running counter 130 with the central processing unit (CPU) Clock Speed Selection data 175 from the central processing unit (CPU) 180, according to the above bit-reversed (TIB) formula, will invert the input 490 to the Clock Flop 115 every other time the double-speed clock 110 rises, as shown in FIG. 4. This is due to the fact that $0000 \leq 0111$, so the input 490 to the Clock Flop 115 is inverted; then 1000>0111, so the input 490 to the Clock Flop 115 is left unchanged; then $0100 \leq 0111$, so the input 490 to the Clock Flop 115 is inverted; then 1100>0111, so the input 490 to the Clock Flop 115 is left unchanged; then $0010 \leq 0111$, so the input 490 to the Clock Flop 115 is inverted; then 1010>0111, so the input 490 to the Clock Flop 115 is left unchanged; then $0110 \leq 0111$, so the input 490 to the Clock Flop 115 is inverted; then 1110>0111, so the input 490 to the Clock Flop 115 is left unchanged; then $0001 \leq 0111$, so the input 490 to the Clock Flop 115 is inverted; then 1001>0111, so the input 490 to the Clock Flop 115 is left unchanged; then $0101 \leq 0111$, so the input 490 to the Clock Flop 115 is inverted; then 1101>0111, so the input 490 to the Clock Flop 115 is left unchanged; then $0011 \leq 0111$, so the input 490 to the Clock Flop 115 is inverted; then 1011>0111, so the input 490 to the Clock Flop 115 is left unchanged; then $0111 \leq 0111$, so the input 490 to the Clock Flop 115 is inverted; then 1111>0111, so the input 490 to the Clock Flop 115 is left unchanged; and so forth.

The input 490 to the Clock Flop 115 will thus be: 0,0,1,1,0, 0,1,1,0,0,1,1,0,0,1,1,0,0,1,1,0,0,1,1,0,0,1,1,0,0,1,1, and so forth. This will result in the desired 50% duty cycle.

By bit-reversing the free-running counter output 135, and using that bit-reversed (TIB) free-running counter output 140 to compare to the Desired Frequency information 175 received from the central processing unit (CPU) 180, the Clock Shaper Logic 150 will calculate an approximation of the clock that would be generated by the Bresenham algorithm, but with much less hardware logic involved. There are other benefits, too. The Bresenham algorithm requires that the running state and the two offsets be changed whenever the Desired Frequency information received from the central processing unit (CPU) is changed. By way of contrast, in various illustrative embodiments according to the present invention, the Desired Frequency information 175 received from the central processing unit (CPU) 180 may be changed at any time, without difficulty and without resetting the free-running counter 130.

Figure 5:
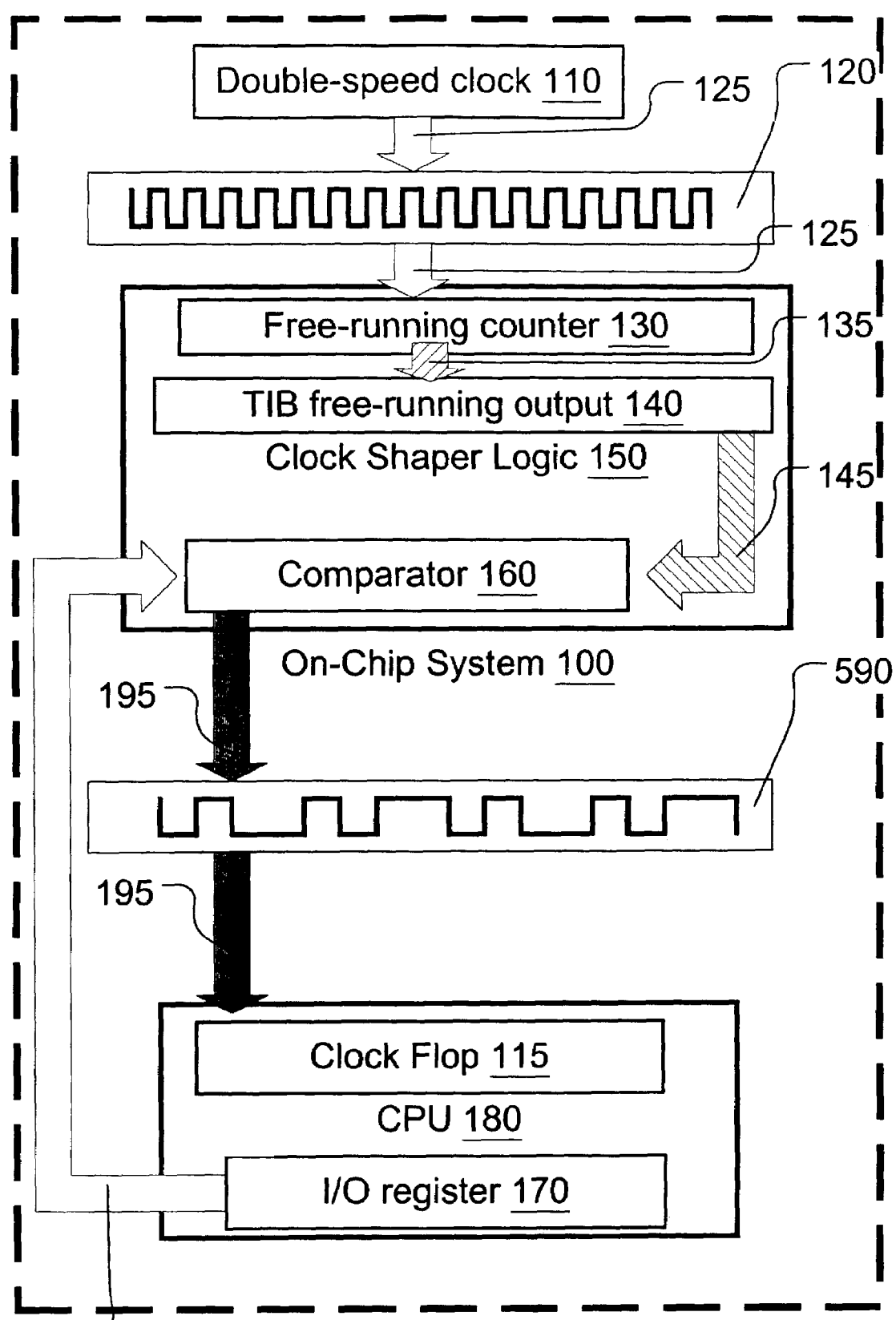

For example, as shown in FIG. 5, when the central processing unit (CPU) 180 requests the speed 1011 (three quarter speed), the comparison (for example, in the comparator 160) of the bit-reversed (TIB) output 140 of the free-running counter 130 with the central processing unit (CPU) Clock Speed Selection data 175 from the central processing unit (CPU) 180, according to the above bit-reversed (TIB) formula, will invert the input 590 to the Clock Flop 115 three quarters of the times the double-speed clock 110 rises. This is due to the fact that $0000 \leq 1011$, so the input 590 to the Clock Flop 115 is inverted; then $1000 \leq 1011$, so the input 590 to the Clock Flop 115 is inverted; then $0100 \leq 1011$, so the input 590 to the Clock Flop 115 is inverted; then $1100 > 1011$, so the input 590 to the Clock Flop 115 is left unchanged; then $0010 \leq 1011$, so the input 590 to the Clock Flop 115 is inverted; then $1010 \leq 1011$, so the input 590 to the Clock Flop 115 is inverted; then $0110 \leq 1011$, so the input 590 to the Clock Flop 115 is inverted; then $1110 > 1011$, so the input 590 to the Clock Flop 115 is left unchanged; then $0001 \leq 1011$, so the input 590 to the Clock Flop 115 is inverted; then $1001 \leq 1011$, so the input 590 to the Clock Flop 115 is inverted; then $0101 \leq 1011$, so the input 590 to the Clock Flop 115 is inverted; then $1101 > 1011$, so the input 590 to the Clock Flop 115 is left unchanged; then $0011 \leq 1011$, so the input 590 to the Clock Flop 115 is inverted; then $1011 \leq 1011$, so the input 590 to the Clock Flop 115 is inverted; then $0111 \leq 1011$, so the input 590 to the Clock Flop 115 is inverted; then $1111 > 1011$, so the input 590 to the Clock Flop 115 is left unchanged; and so forth. The input 590 to the Clock Flop 115 will thus be: 0,1,0,0,1,0,1,1,0,1, 0,0,1,0,1,1,0,1,0,0,1,0,1,1,0,1,0,0,1,0,1,1, and so forth. This will result in the desired 75% duty cycle.

Figure 6:
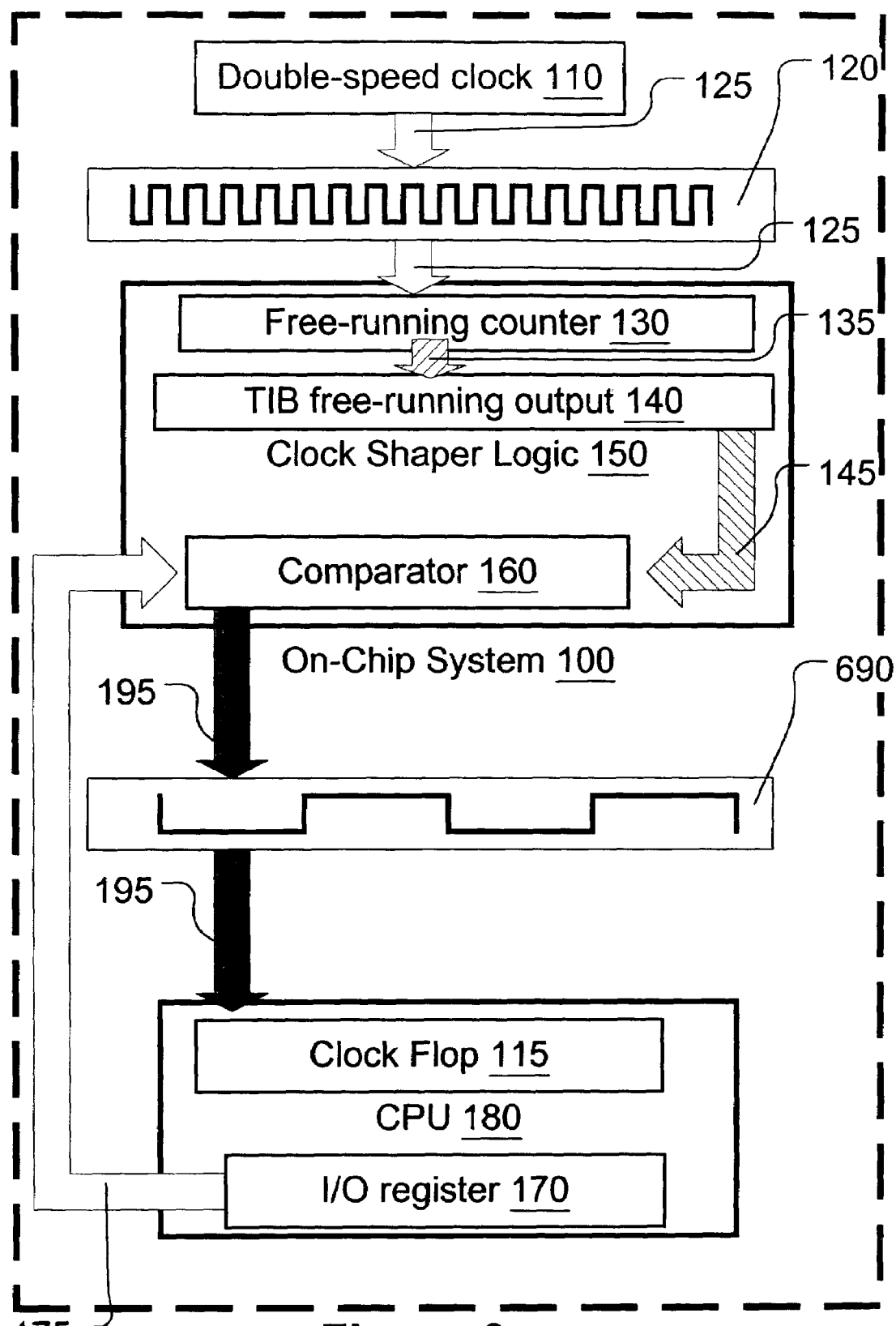

Similarly, as shown in FIG. 6, when the central processing unit (CPU) 180 requests the speed 0011 (one quarter speed), the comparison (for example, in the comparator 160) of the bit-reversed (TIB) output 140 of the free-running counter 130 with the central processing unit (CPU) Clock Speed Selection data 175 from the central processing unit (CPU) 180, according to the above bit-reversed (TIB) formula, will invert the input 690 to the Clock Flop 115 one quarter of the times the double-speed clock 110 rises. This is due to the fact that $0000 \leq 0011$, so the input 690 to the Clock Flop 115 is inverted; then $1000 > 0011$, so the input 690 to the Clock Flop 115 is left unchanged; then $0100 > 0011$, so the input 690 to the Clock Flop 115 is left unchanged; then $1100 > 0011$, so the input 690 to the Clock Flop 115 is left unchanged; then $0010 \leq 0011$, so the input 690 to the Clock Flop 115 is inverted; then $1010 > 0011$, so the input 690 to the Clock Flop 115 is left unchanged; then $0110 > 0011$, so the input 690 to the Clock Flop 115 is left unchanged; then $1110 > 0011$, so the input 690 to the Clock Flop 115 is left unchanged; then $0001 \leq 0011$, so the input 690 to the Clock Flop 115 is inverted; then $1001 > 0011$, so the input 690 to the Clock Flop 115 is left unchanged; then $0101 > 0011$, so the input 690 to the Clock Flop 115 is left unchanged; then $1101 > 0011$, so the input 690 to the Clock Flop 115 is left unchanged; then $0011 \leq 0011$, so the input 690 to the Clock Flop 115 is inverted; then $1011 > 0011$, so the input 690 to the Clock Flop 115 is left unchanged; then $0111 > 0011$, so the input 690 to the Clock Flop 115 is left unchanged; then $1111 > 0011$, so the input 690 to the Clock Flop 115 is left unchanged; and so forth. The input 690 to the Clock Flop 115 will thus be: 0,0,0,0,1,1,1,1,0,0,0,0,1,1,1,1,0,0,0,0,1,1,1,1,0,0,0,0,1,1,1,1, and so forth. This will result in the desired 25% duty cycle.

Figure 7:
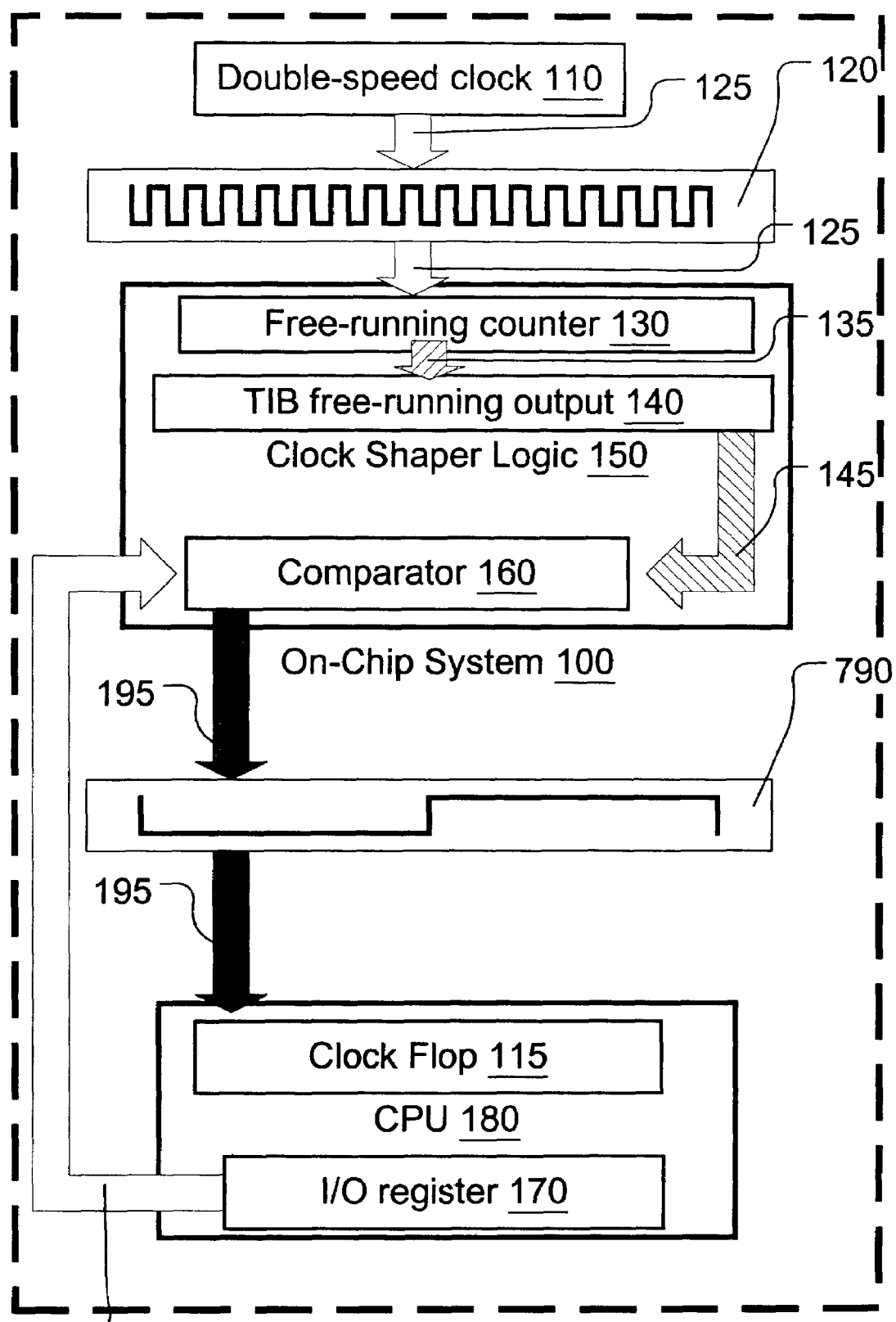

Likewise, as shown in FIG. 7, when the central processing unit (CPU) 180 requests the speed 0001 (one eighth speed), the comparison (for example, in the comparator 160) of the bit-reversed (TIB) output 140 of the free-running counter 130 with the central processing unit (CPU) Clock Speed Selection data 175 from the central processing unit (CPU) 180, according to the above bit-reversed (TIB) formula, will invert the input 790 to the Clock Flop 115 one eighth of the times the double-speed clock 110 rises. This is due to the fact that $0000 \leq 0001$, so the input 790 to the Clock Flop 115 is inverted; then $1000 > 0001$, so the input 790 to the Clock Flop 115 is left unchanged; then $0100 > 0001$, so the input 790 to the Clock Flop 115 is left unchanged; then $1100 > 0001$, so the input 790 to the Clock Flop 115 is left unchanged; then $0010 > 0001$, so the input 790 to the Clock Flop 115 is left unchanged; then $1010 > 0001$, so the input 790 to the Clock Flop 115 is left unchanged; then $0110 > 0001$, so the input 790 to the Clock Flop 115 is left unchanged; then $1110 > 0001$, so the input 790 to the Clock Flop 115 is left unchanged; then $0001 \leq 0001$, so the input 790 to the Clock Flop 115 is inverted; then $1001 > 0001$, so the input 790 to the Clock Flop 115 is left unchanged; then $0101 > 0001$, so the input 790 to the Clock Flop 115 is left unchanged; then $1101 > 0001$, so the input 790 to the Clock Flop 115 is left unchanged; then $0011 > 0001$, so the input 790 to the Clock Flop 115 is left unchanged; then $1011 > 0001$, so the input 790 to the Clock Flop 115 is left unchanged; then $0111 > 0001$, so the input 790 to the Clock Flop 115 is left unchanged; then $1111 > 0001$, so the input 790 to the Clock Flop 115 is left unchanged; and so forth. The input 790 to the Clock Flop 115 will thus be: 0,0,0,0,0,0,0,0,1,1,1,1,1,1,1,1, 0,0,0,0,0,0,0,0,1,1,1,1,1,1,1,1, and so forth. This will result in the desired 12.5% duty cycle.

In various illustrative embodiments according to the present invention, the Clock Frequency may be varied adaptively based on a measure of the load on the central processing unit (CPU). If a work queue is maintained in hardware, the depth of the work queue can be known. When the work queue starts getting more entries in the work queue than desired, or when an element in the work queue has been in the work queue too long, the Desired Frequency Value originally set by the central processing unit (CPU) can be incremented and increased. Conversely, after the work queue has been empty for a certain amount of time, or if all entries in the work queue are quite recent, the Desired Frequency Value for the central processing unit (CPU) can be decremented and decreased. Rather than jumping directly to full speed, only to fall back to idle soon thereafter, these adaptively varied illustrative embodiments let the central processing unit (CPU) Clock be changed in steps until the central processing unit (CPU) is executing approximately the right number of instructions per second that the central processing unit (CPU) needs to do to perform the work the central processing unit (CPU) is given.

In various illustrative embodiments according to the present invention, the Clock Frequency may be changed quickly in response to special conditions. The special conditions can have separate inputs to the Clock Shaper Logic. These inputs can be synchronized to the double-speed counter domain and then used as additional inputs to calculate the data to send to the Clock Flop. For example, in Sun Microsystem's Copernicus Chip, it is desirable to have the central processing unit (CPU) Clock run slow when the central processing unit (CPU) has nothing to do. However, when an input/output (I/O) device needs to get access to on-chip resources, the slowly running central processing unit (CPU) Clock will result in corresponding slow access to on-chip resources, such as on-chip memory.

In the Copernicus chip, the Clock Shaper Logic has signals from the Interrupt Logic and the PCI Bus Arbiter. When any interrupts or direct memory accesses (DMAs) are pending, the central processing unit (CPU) Clock is temporarily boosted up to full speed. In the Copernicus chip, the Clock Shaper Logic has memory of Interrupts and External Bus activity. Whenever the Clock Shaper Logic has sped up the central processing unit (CPU) Clock because of one of these special conditions, the Clock Shaper Logic leaves the central processing unit (CPU) Clock running fast for a period after the special condition is removed. This technique lets software calculate a new value for the Desired Clock Frequency after an interrupt has been serviced, and lets internal First In First Out (FIFO) registers drain after a Bus Transaction has finished on the external bus.

FIGS. 8–13 schematically illustrate particular embodiments of respective methods 800–1300 practiced in accordance with the present invention. FIGS. 1–7 schematically illustrate various exemplary particular embodiments with which the methods 800–1300 may be practiced. For the sake of clarity, and to further an understanding of the invention, the methods 800–1300 shall be disclosed in the context of the various exemplary particular embodiments shown in FIGS. 1–7. However, the present invention is not so limited and admits wide variation, as is discussed further below.

Figure 8:
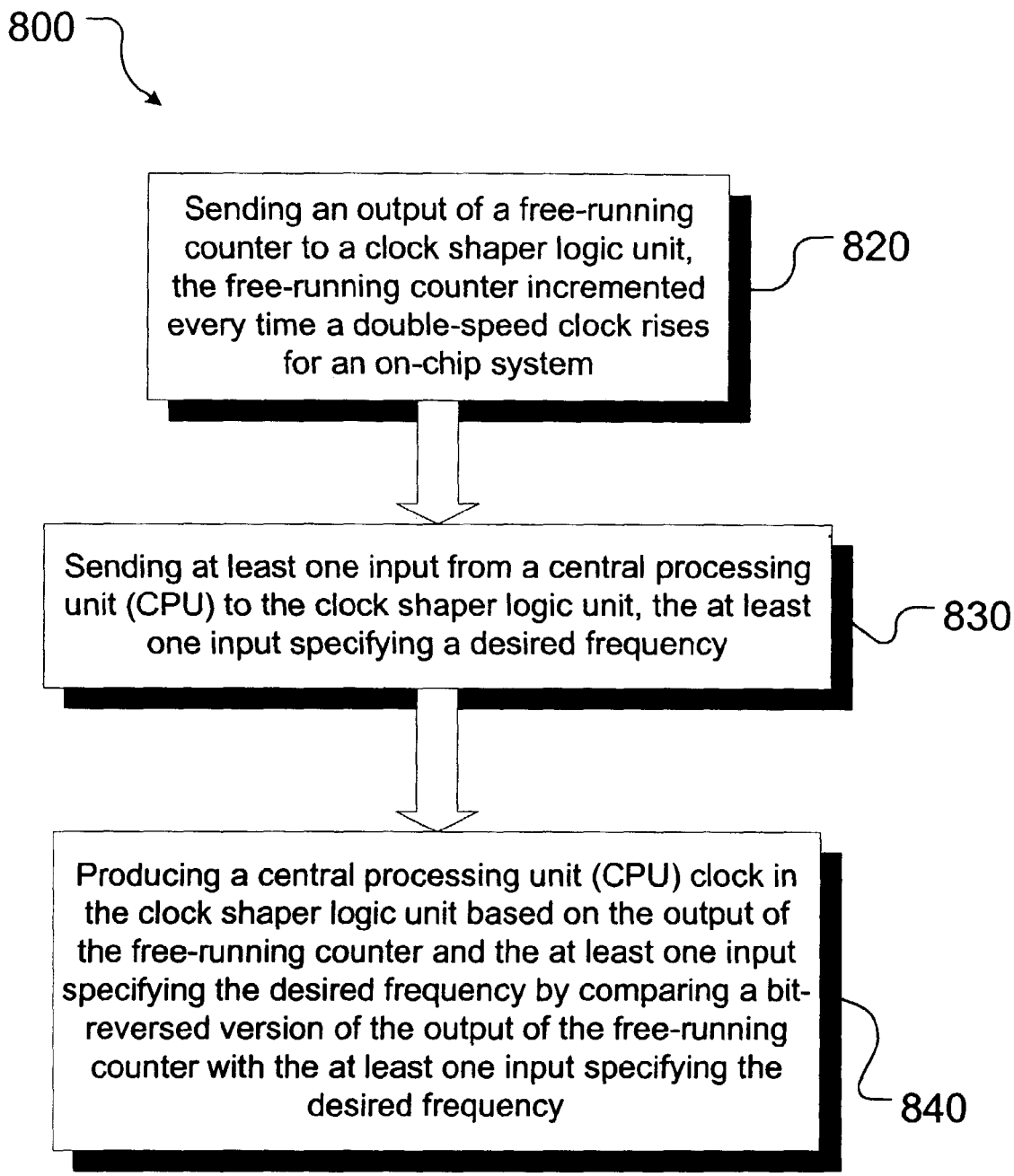

As shown in FIG. 8, the method 800 begins, as set forth in box 820, by sending an output of a free-running counter to a comparator for a clock shaper logic unit, the free-running counter incremented every time a double-speed clock rises for an on-chip system. For example, as shown in FIG. 1, the output 135 of the free-running counter 130 may be sent to the comparator 160 for the Clock Shaper Logic unit 150, the free-running counter 130 incremented every time the double-speed clock 110 rises for the on-chip system 110. In various alternative illustrative embodiments, the free-running counter 130 and/or the comparator 160 may be provided in the on-chip system 110 apart from, yet under the control of, the Clock Shaper Logic unit 150.

The method 800 proceeds by sending at least one input from a central processing unit (CPU) to the comparator for the clock shaper logic unit, the at least one input specifying a desired frequency, as set forth in box 830. For example, as shown in FIG. 1, at least one input 175 from the input/output (I/O) register 170 of the central processing unit (CPU) 180 may be sent to the comparator 160 for the Clock Shaper Logic unit 150, the at least one input 175 specifying a Desired Frequency for the central processing unit (CPU) 180.

The method 800 then proceeds, as set forth in box 840, by producing a central processing unit (CPU) clock in the clock shaper logic unit based on the output of the free-running counter and the at least one input specifying the desired frequency by comparing a bit-reversed version of the output of the free-running counter with the at least one input specifying the desired frequency. For example, as shown in FIG. 1, the Clock Shaper Logic unit 150 may produce the input 190 to the Clock Flop 115 to drive the central processing unit (CPU) 180 clock. The Clock Shaper Logic unit 150 may produce the input 190 to the Clock Flop 115 based on the output 135 of the free-running counter 130 and the at least one input 175 specifying the desired frequency by comparing the bit-reversed (TIB) version 140 of the output 135 of the free-running counter 130 with the at least one input 175 specifying the desired frequency.

Figure 9:
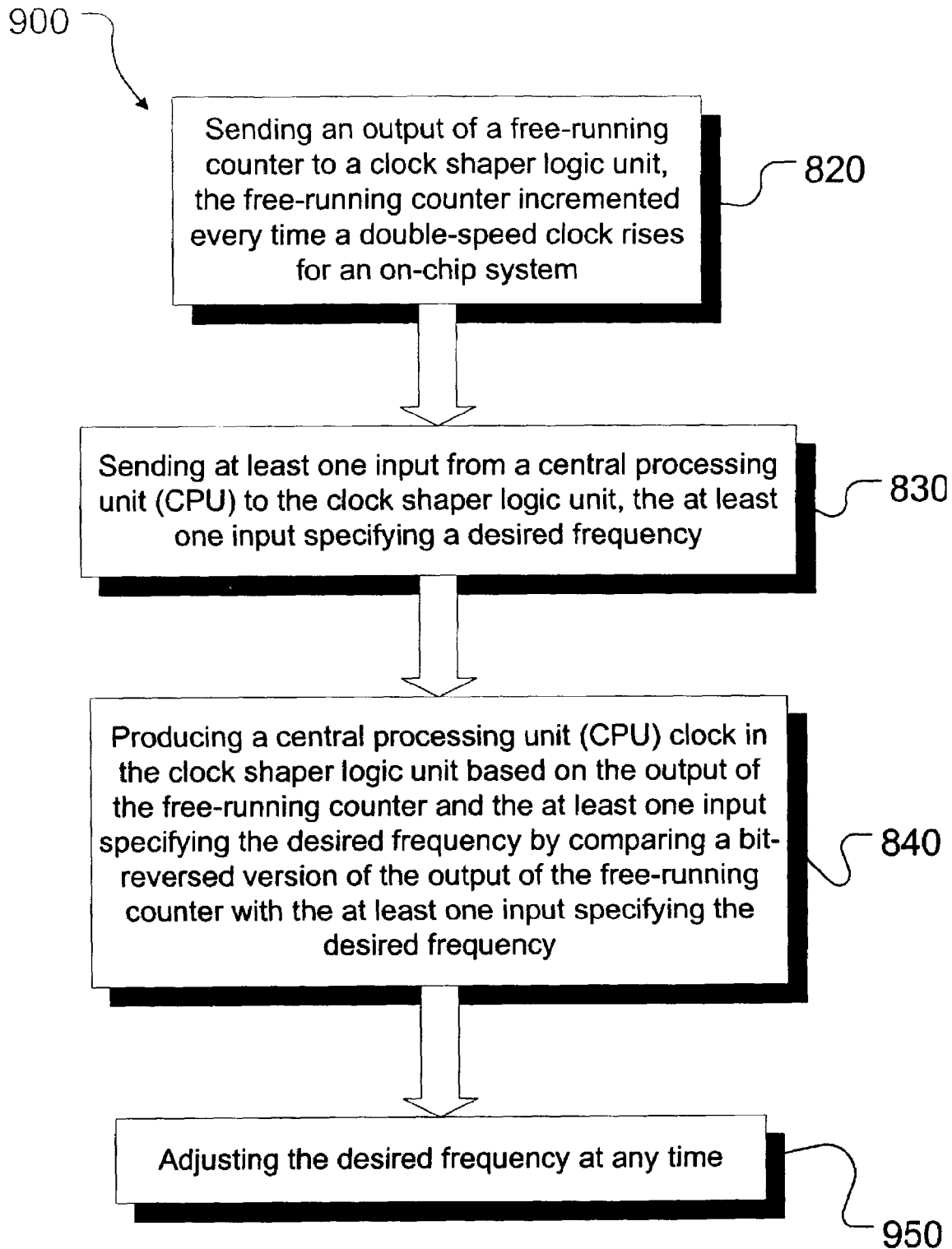
Figure 10:
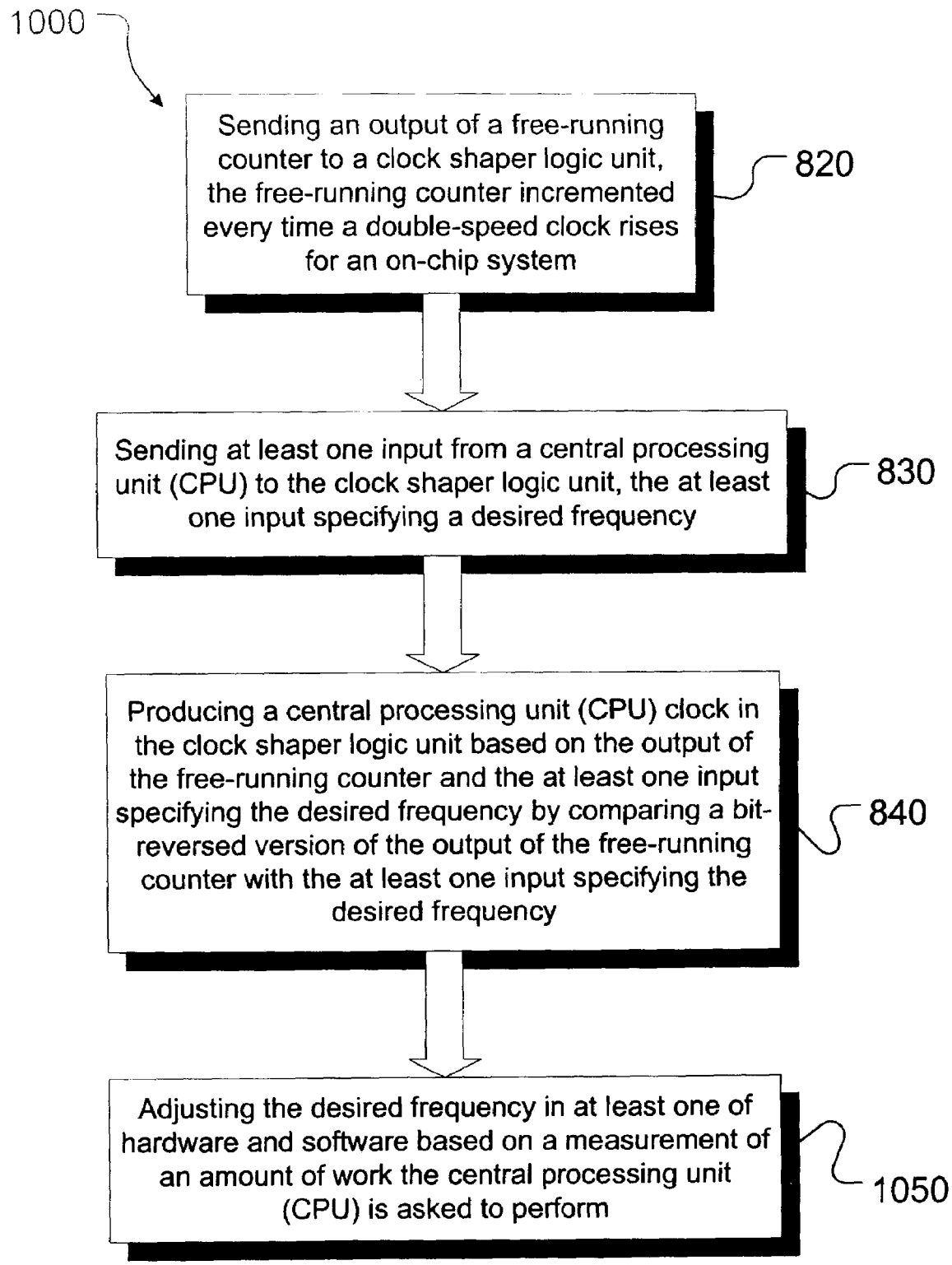
Figure 11:
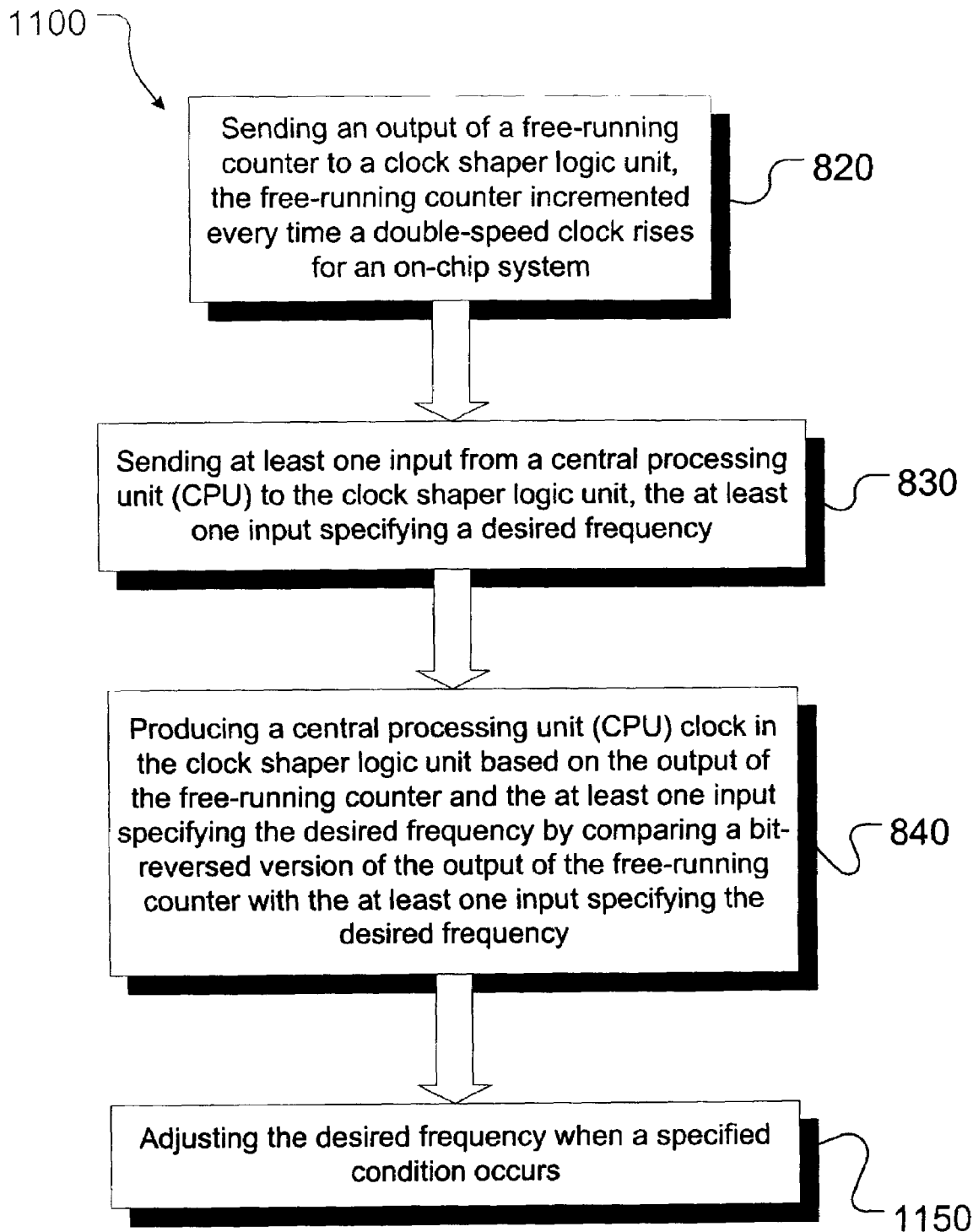

In various illustrative embodiments, as shown in FIG. 9, and as set forth in box 950 of method 900, the desired frequency may be adjusted at any time. In various alternative illustrative embodiments, as shown in FIG. 10, and as set forth in box 1050 of method 1000, the desired frequency may be adjusted in the hardware and/or the software based on one or more measurements of the amount of work the central processing unit (CPU) 180 is asked to perform. In various other alternative illustrative embodiments, as shown in FIG. 11, and as set forth in box 1150 of method 1100, the desired frequency may be adjusted when a specified condition occurs. For example, as described above, the special condition can have separate inputs to the Clock Shaper Logic. These inputs can be synchronized to the double-speed counter domain and then used as additional inputs to calculate the data to send to the Clock Flop. For example, in Sun Microsystem's Copernicus Chip, it is desirable to have the central processing unit (CPU) Clock run slow when the central processing unit (CPU) has nothing to do. However, when an input/output (I/O) device needs to get access to on-chip resources, the slowly running central processing unit (CPU) Clock will result in corresponding slow access to on-chip resources, such as on-chip memory.

Figure 12:
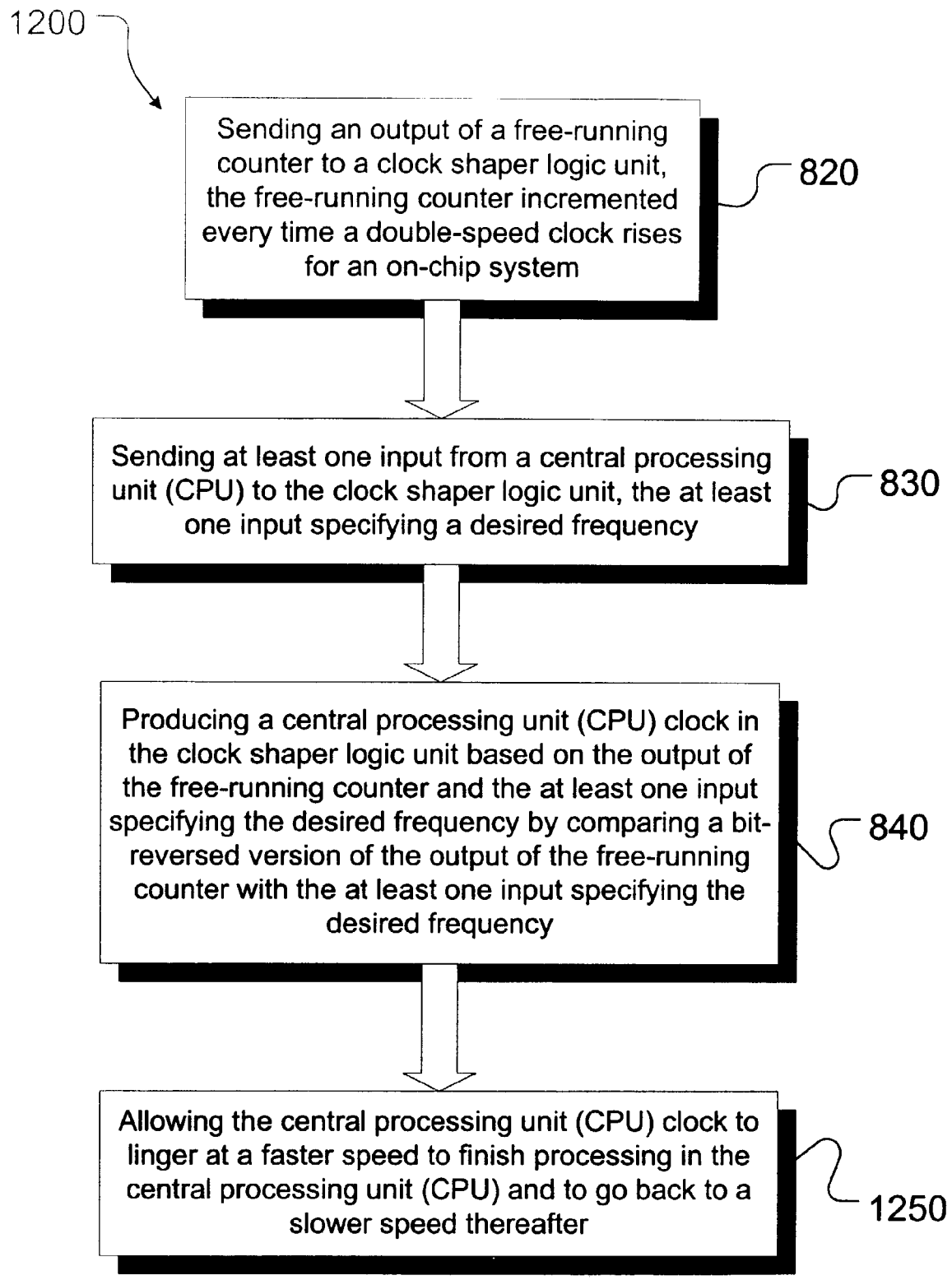

In yet other various alternative illustrative embodiments, as shown in FIG. 12, and as set forth in box 1250 of method 1200, the central processing unit (CPU) clock may be allowed to linger at a faster speed to finish processing in the central processing unit (CPU) and to go back to a slower speed thereafter. For example, as described above, in the Copernicus chip, the Clock Shaper Logic has signals from the Interrupt Logic and the PCI Bus Arbiter. When any interrupts or DMAs are pending, the central processing unit (CPU) Clock is temporarily boosted up to full speed. In the Copernicus chip, the Clock Shaper Logic has memory of Interrupts and External Bus activity. Whenever the Clock Shaper Logic has sped up the central processing unit (CPU) Clock because of one of these special conditions, the Clock Shaper Logic leaves the central processing unit (CPU) Clock running fast for a period after the special condition is removed. This technique lets software calculate a new value for the Desired Clock Frequency after an interrupt has been serviced, and lets internal First In First Out (FIFO) registers drain after a Bus Transaction has finished on the external bus.

Figure 13:
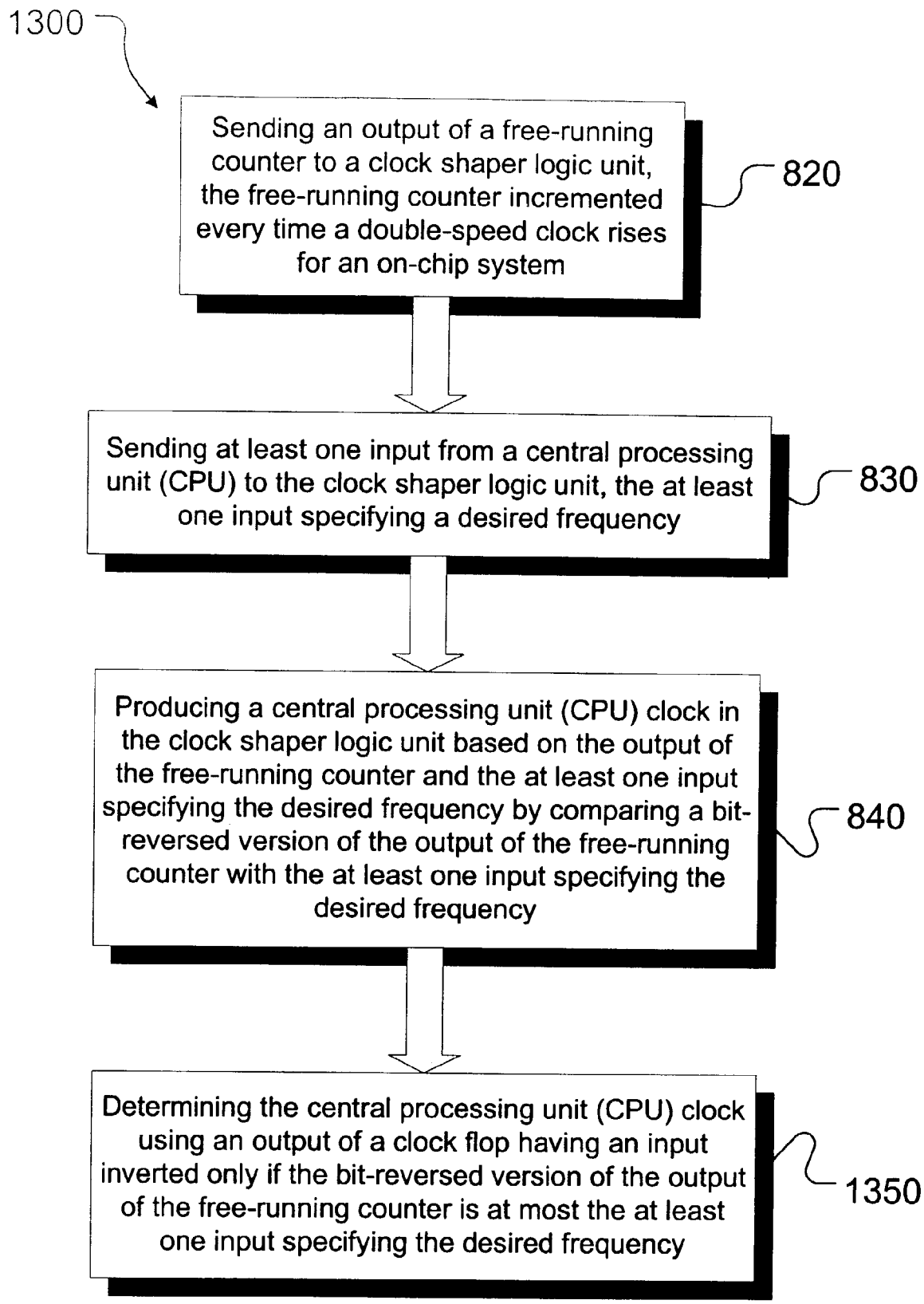

In various illustrative embodiments, as shown in FIG. 13, and as set forth in box 1350 of method 1300, the central processing unit (CPU) clock may be determined using an output of a clock flop having an input inverted only if the bit-reversed version of the output of the free-running counter is not greater than the at least one input specifying the desired frequency. For example, as described above, when the central processing unit (CPU) 180 requests the speed specified by an n-bit number, the comparison (for example, in the comparator 160) of the bit-reversed (TIB) n-bit output 140 of the free-running counter 130 with the central processing unit (CPU) Clock Speed Selection data 175 from the central processing unit (CPU) 180, may be made according to the following bit-reversed (TIB) formula:

If the bit-reversed (TIB) n-bit output 140 of the free-running counter 130 is less than or equal to the n-bit central processing unit (CPU) Clock Speed Selection data 175, invert the input 190 to the Clock Flop 115; otherwise, leave the input 190 to the Clock Flop 115 unchanged.

Any of the above-disclosed embodiments of a method, a system and a device according to the present invention enables a simple way of building an on-chip clock system that can quickly hop from frequency to frequency as needed. Additionally, any of the above-disclosed embodiments of a method, a system and a device according to the present invention enables a central processing unit (CPU) to jump from sleep or idle mode to full speed quickly.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. In particular, every range of values (of the form, "from about a to about b," or, equivalently, "from approximately a to b," or, equivalently, "from approximately a–b") disclosed herein is to be understood as referring to the power set (the set of all subsets) of the respective range of values, in the sense of Georg Cantor. Accordingly, the protection sought herein is as set forth in the claims below.

What is claimed:

1. A method comprising:
   sending an output of a free-running counter to a comparator for a clock shaper logic unit, the free-running counter incremented every time a double-speed clock rises for an on-chip system;
   sending at least one input from a central processing unit (CPU) to the comparator for the clock shaper logic unit, the at least one input specifying a desired frequency; and
   producing a central processing unit (CPU) clock in the clock shaper logic unit based on the output of the free-running counter and the at least one input specifying the desired frequency by comparing a bit-reversed version of the output of the free-running counter with the at least one input specifying the desired frequency.

2. The method of claim 1, wherein producing the central processing unit (CPU) clock in the clock shaper logic unit based on comparing the bit-reversed version of the output of the free-running counter with the at least one input specifying the desired frequency further comprises adjusting the desired frequency at any time.

3. The method of claim 2, wherein producing the central processing unit (CPU) clock in the clock shaper logic unit based on comparing the bit-reversed version of the output of the free-running counter with the at least one input specifying the desired frequency further comprises determining the central processing unit (CPU) clock using an output of a clock flop having an input inverted only if the bit-reversed version of the output of the free-running counter one input specifying the desired frequency.

4. The method of claim 1, wherein producing the central processing unit (CPU) clock in the clock shaper logic unit based on comparing the bit-reversed version of the output of the free-running counter with the at least one input specifying the desired frequency further comprises adjusting the desired frequency in at least one of hardware and software based on a measurement of an amount of work the central processing unit (CPU) is asked to perform.

5. The method of claim 4, wherein producing the central processing unit (CPU) clock in the clock shaper logic unit based on comparing the bit-reversed version of the output of the free-running counter with the at least one input specifying the desired frequency further comprises determining the central processing unit (CPU) clock using an output of a clock flop having an input inverted only if the bit-reversed version of the output of the free-running counter is not greater than the at least one input specifying the desired frequency.

6. The method of claim 1, wherein producing the central processing unit (CPU) clock in the clock shaper logic unit based on comparing the bit-reversed version of the output of the free-running counter with the at least one input specifying the desired frequency further comprises adjusting the desired frequency when a specified condition occurs.

7. The method of claim 6, wherein producing the central processing unit (CPU) clock in the clock shaper logic unit based on comparing the bit-reversed version of the output of the free-running counter with the at least one input specifying the desired frequency further comprises determining the central processing unit (CPU) clock using an output of a clock flop having an input inverted only if the bit-reversed version of the output of the free-running counter is not greater than the at least one input specifying the desired frequency.

8. The method of claim 1, wherein producing the central processing unit (CPU) clock in the clock shaper logic unit based on comparing the bit-reversed version of the output of the free-running counter with the at least one input specifying the desired frequency further comprises allowing the central processing unit (CPU) clock to linger at a faster speed to finish processing in the central processing unit (CPU) and to go back to a slower speed thereafter.

9. The method of claim 8, wherein producing the central processing unit (CPU) clock in the clock shaper logic unit based on comparing the bit-reversed version of the output of the free-running counter with the at least one input specifying the desired frequency further comprises determining the central processing unit (CPU) clock using an output of a clock flop having an input inverted only if the bit-reversed version of the output of the free-running counter is not greater than the at least one input specifying the desired frequency.

10. The method of claim 1, wherein producing the central processing unit (CPU) clock in the clock shaper logic unit based on comparing the bit-reversed version of the output of the free-running counter with the at least one input specifying the desired frequency further comprises determining the central processing unit (CPU) clock using an output of a clock flop having an input inverted only if the bit-reversed version of the output of the free-running counter is not greater than the at least one input specifying the desired frequency.

11. The method of claim 1, wherein producing the central processing unit (CPU) clock in the clock shaper logic unit based on comparing the bit-reversed version of the output of the free-running counter with the at least one input specifying the desired frequency further comprises determining the central processing unit (CPU) clock using an output of a clock flop having an input up-righted if the bit-reversed version of the output of the free-running counter is less than the at least one input specifying the desired frequency.

12. The method of claim 1, wherein the method is performed by instructions encoded within a computer-readable, program storage device and wherein when executed by a computer the instructions perform the method.

13. The method of claim 1, wherein the method is performed by a computer that has been programmed to perform the method.

14. The method of claim 1, wherein the method is performed within an on-chip system.

15. An apparatus comprising:
a clock shaper logic unit having a comparator;
a free-running counter capable of sending an output to the comparator of the clock shaper logic unit, the free-running counter incremented every time a double-speed clock rises for the on-chip system; and
a central processing unit (CPU) capable of sending at least one input to the comparator of the clock shaper logic unit, the at least one input specifying a desired frequency, wherein the clock shaper logic unit is capable of producing a central processing unit (CPU) clock based on the output of the free-running counter and the at least one input specifying the desired frequency by comparing a bit-reversed version of the output of the free-running counter with the at least one input specifying the desired frequency.

16. The apparatus of claim 15, wherein the clock shaper logic unit is capable of adjusting the desired frequency at any time.

17. The apparatus of claim 16, wherein the clock shaper logic unit is capable of determining the central processing unit (CPU) clock using an output of a clock flop having an input inverted only if the bit-reversed version of the output of the free-running counter is not greater than the at least one input specifying the desired frequency.

18. The apparatus of claim 15, wherein the clock shaper logic unit is capable of adjusting the desired frequency in at least one of hardware and software based on a measurement of an amount of work the central processing unit (CPU) is asked to perform.

19. The apparatus of claim 18, wherein the clock shaper logic unit is capable of determining the central processing unit (CPU) clock using an output of a clock flop having an input inverted only if the bit-reversed version of the output of the free-running counter is not greater than the at least one input specifying the desired frequency.

20. The apparatus of claim 15, wherein the clock shaper logic unit is capable of adjusting the desired frequency when a specified condition occurs.

21. The apparatus of claim 20, wherein the clock shaper logic unit is capable of determining the central processing unit (CPU) clock using an output of a clock flop having an input inverted only if the bit-reversed version of the output of the free-running counter is not greater than the at least one input specifying the desired frequency.

22. The apparatus of claim 15, wherein the clock shaper logic unit is capable of allowing the central processing unit (CPU) clock to linger at a faster speed to finish processing in the central processing unit (CPU) and to go back to a slower speed thereafter.

23. The apparatus of claim 22, wherein the clock shaper logic unit is capable of determining the central processing unit (CPU) clock using an output of a clock flop having an input inverted only if the bit-reversed version of the output of the free-running counter is not greater than the at least one input specifying the desired frequency.

24. The apparatus of claim 15, wherein the clock shaper logic unit is capable of determining the central processing unit (CPU) clock using an output of a clock flop having an input inverted only if the bit-reversed version of the output of the free-running counter is not greater than the at least one input specifying the desired frequency.

25. The apparatus of claim 15, wherein the clock shaper logic unit, the free-running counter capable of sending, and the CPU are all located within an on-chip system.

26. The apparatus of claim 15, wherein the central processing unit (CPU) clock may be encoded as an n-bit number and wherein desired frequency may specify one of $2^n$ discrete flip-flop rates.

27. An apparatus comprising:
means for sending an output of a free-running counter to a comparator for a clock shaper logic unit, the free-running counter incremented every time a double-speed clock rises for an on-chip system;
means for sending at least one input from a central processing unit (CPU) to the comparator for the clock shaper logic unit, the at least one input specifying a desired frequency; and
means for producing a central processing unit (CPU) clock in the clock shaper logic unit based on the output of the free-running counter and the at least one input specifying the desired frequency by comparing a bit-reversed version of the output of the free-running counter with the at least one input specifying the desired frequency.

28. The apparatus of claim 27, wherein the means for producing the central processing unit (CPU) clock in the clock shaper logic unit based on comparing the bit-reversed version of the output of the free-running counter with the at least one input specifying the desired frequency further comprises means for adjusting the desired frequency at any time.

29. The apparatus of claim 28, wherein the means for producing the central processing unit (CPU) clock in the clock shaper logic unit based on comparing the bit-reversed version of the output of the free-running counter with the at least one input specifying the desired frequency further comprises means for determining the central processing unit (CPU) clock using an output of a clock flop having an input inverted only if the bit-reversed version of the output of the free-running counter is not greater than the at least one input specifying the desired frequency.

30. The apparatus of claim 27, wherein the means for producing the central processing unit (CPU) clock in the clock shaper logic unit based on comparing the bit-reversed version of the output of the free-running counter with the at least one input specifying the desired frequency further comprises means for adjusting the desired frequency in at least one of hardware and software based on a measurement of an amount of work the central processing unit (CPU) is asked to perform.

31. The apparatus of claim 30, wherein the means for producing the central processing unit (CPU) clock in the clock shaper logic unit based on comparing the bit-reversed version of the output of the free-running counter with the at least one input specifying the desired frequency further comprises means for determining the central processing unit (CPU) clock using an output of a clock flop having an input inverted only if the bit-reversed version of the output of the free-running counter is not greater than the at least one input specifying the desired frequency.

32. The apparatus of claim 27, wherein the means for producing the central processing unit (CPU) clock in the clock shaper logic unit based on comparing the bit-reversed version of the output of the free-running counter with the at least one input specifying the desired frequency further comprises means for adjusting the desired frequency when a specified condition occurs.

33. The apparatus of claim 32, wherein the means for producing the central processing unit (CPU) clock in the clock shaper logic unit based on comparing the bit-reversed version of the output of the free-running counter with the at least one input specifying the desired frequency further comprises means for determining the central processing unit (CPU) clock using an output of a clock flop having an input inverted only if the bit-reversed version of the output of the free-running counter is not greater than the at least one input specifying the desired frequency.

34. The apparatus of claim 27, wherein the means for producing the central processing unit (CPU) clock in the clock shaper logic unit based on comparing the bit-reversed version of the output of the free-running counter with the at least one input specifying the desired frequency further comprises means for allowing the central processing unit (CPU) clock to linger at a faster speed to finish processing in the central processing unit (CPU) and to go back to a slower speed thereafter.

35. The apparatus of claim 34, wherein the means for producing the central processing unit (CPU) clock in the clock shaper logic unit based on comparing the bit-reversed version of the output of the free-running counter with the at least one input specifying the desired frequency further comprises means for determining the central processing unit (CPU) clock using an output of a clock flop having an input inverted only if the bit-reversed version of the output of the free-running counter is not greater than the at least one input specifying the desired frequency.

36. The apparatus of claim 27, wherein the means for producing the central processing unit (CPU) clock in the clock shaper logic unit based on comparing the bit-reversed version of the output of the free-running counter with the at least one input specifying the desired frequency further comprises means for determining the central processing unit (CPU) clock using an output of a clock flop having an input inverted only if the bit-reversed version of the output of the free-running counter is not greater than the at least one input specifying the desired frequency.

* * * * *